United States Patent
Toki et al.

(10) Patent No.: US 7,007,677 B2
(45) Date of Patent: Mar. 7, 2006

(54) RESERVOIR UNIT

(75) Inventors: Tomonari Toki, Ohbu (JP); Nobuo Suzuki, Ohbu (JP)

(73) Assignee: Aisan Kogyo Kabushiki Kaisha, Ohbu (JP)

( * ) Notice: Subject to any disclaimer, the term of this patent is extended or adjusted under 35 U.S.C. 154(b) by 183 days.

(21) Appl. No.: 10/400,801

(22) Filed: Mar. 28, 2003

(65) Prior Publication Data

US 2003/0188786 A1 Oct. 9, 2003

(30) Foreign Application Priority Data

Apr. 3, 2002 (JP) .............................. 2002-101248

(51) Int. Cl.
*F02M 37/04* (2006.01)
(52) U.S. Cl. .................. 123/509; 123/514; 137/565.34
(58) Field of Classification Search ................ 123/509, 123/514, 510; 137/565.34, 576, 572, 574, 137/565.22
See application file for complete search history.

(56) References Cited

U.S. PATENT DOCUMENTS

| | | | | |
|---|---|---|---|---|
| 4,842,006 A | * | 6/1989 | Scheurenbrand et al. | ... 137/202 |
| 4,886,031 A | * | 12/1989 | Scheurenbrand et al. | ... 123/516 |
| 5,699,773 A | * | 12/1997 | Kleppner et al. | ........... 123/510 |
| 5,769,061 A | * | 6/1998 | Nagata et al. | ............... 123/509 |
| 5,992,394 A | * | 11/1999 | Mukaidani et al. | ......... 123/509 |
| 6,123,511 A | * | 9/2000 | Sertier | ......................... 417/87 |
| 6,305,417 B1 | * | 10/2001 | Kleppner et al. | ...... 137/565.34 |
| 6,425,378 B1 | * | 7/2002 | Frank | ......................... 123/514 |
| 6,513,503 B1 | * | 2/2003 | Iwamoto et al. | ............ 123/509 |
| 6,598,594 B1 | * | 7/2003 | Takahashi | .................... 123/514 |

* cited by examiner

*Primary Examiner*—Carl S. Miller
(74) *Attorney, Agent, or Firm*—Stevens, Davis, Miller & Mosher, LLP

(57) ABSTRACT

A reservoir unit to be installed within a fuel tank, in order to prevent bubbles generated by the fuel transfer jet pump of the fuel tank from feeding into the internal combustion engine, comprising a wall formed in a closed bag shape so that the delivered flow of fuel can fully turn round the discharge port of a jet pump, against which fuel containing bubbles delivered from the jet pump hits and, after turning around a partition wall a plurality of times, fills the reservoir unit, with the result that bubbles can be removed from the fuel more efficiently and the fuel in the reservoir can be prevented from containing a large quantity of bubbles.

8 Claims, 9 Drawing Sheets

RESERVOIR UNIT

BACKGROUND OF THE INVENTION

1. Field of the Invention

The present invention relates to a fuel supply equipment which can be suitably used in supplying fuel in a fuel tank of a motor vehicle to its engine or the like. More particularly, it relates to a reservoir unit comprising a reservoir which is installed in a fuel tank to prevent the fuel pump from racing when the remaining volume of fuel in the tank has become very small and a jet pump for introducing fuel outside that reservoir into the reservoir.

2. Description of the Related Art

A conventional fuel tank for motor vehicles or the like uses a fuel supply equipment comprising a sub-tank formed in the fuel tank, a fuel pump for sucking fuel in the sub-tank, a pressure regulator for regulating the pressure of the fuel discharged from the fuel pump by allowing part of the fuel discharged by the fuel pump to escape, and a jet pump, fixed to a wall of the sub-tank, for receiving the fuel escaping from the pressure regulator, utilizing the flow velocity of the escaping fuel to generate a negative pressure and using that negative pressure to introduce the fuel outside the sub-tank into the sub-tank.

This fuel supply equipment causes the fuel in the sub-tank to be fed to the vehicle engine or the like by the fuel pump. The pressure of fuel fed to the vehicle engine or the like is kept constant by the pressure regulator. Whereas keeping the pressure constant requires letting any excess volume of fuel escape, the energy that the escaping fuel has is utilized to introduce the fuel outside the sub-tank into the sub-tank. With this fuel supply equipment, even if the fuel in the fuel tank decreases and its surface level drops, the fuel level in the sub-tank is kept high, thereby enabling the last drop of fuel in the fuel tank to be effectively used.

When the fuel outside the sub-tank is introduced into the sub-tank with the jet pump, bubbles are apt to be introduced into the sub-tank. According to the related art, a large enough capacity of the sub-tank is secured not to allow bubbles to spread throughout the inside space of the sub-tank.

It is difficult to form a sub-tank in a resin-built fuel tank, which is coming into extensive use. In view of this difficulty, instead of forming a sub-tank, a structure in which a cylindrical reservoir having a bottom is installed in the fuel tank is beginning to be adopted. In this case, the reservoir is reduced in size with a corresponding limitation on its capacity. As a result, bubbles in the fuel fed by a jet pump into the reservoir tend to spread throughout the inside of the reservoir. If bubbles pervade throughout the inside of the reservoir, various problems will arise, such as vapor locking of the fuel pump and the failure of the intended quantity of fuel to reach the engine or the like due to the presence of bubbles in the fuel.

SUMMARY OF THE INVENTION

An object of the present invention, created in view of the problems noted above, is to extinguish the bubbles which would otherwise accompany the introduction of fuel outside a reservoir into the reservoir by a jet pump to be introduced into the reservoir and thereby to prevent the presence of a large quantity of bubbles in the fuel contained in the reservoir.

The invention makes use of the finding that, by causing the flow of bubble-containing fuel discharged from the jet pump to hit a wall, the fuel in the reservoir (at least the part of the fuel near the bottom of the reservoir where the sucking action of the fuel pump works) can be prevented from letting a large quantity of bubbles being present therein.

According to the invention, there is provided a reservoir unit having an anti-bubble device, comprising a cylindrical reservoir having a bottom installed in a fuel tank; a fuel pump for sucking fuel in that reservoir: a pressure regulator for regulating the pressure of the fuel delivered from the fuel pump at a constant level by allowing part of the fuel delivered from that fuel pump to escape; a jet pump for receiving that fuel escaping from the pressure regulator, generating a negative pressure by utilizing its flow velocity, and introducing fuel outside the reservoir into the reservoir with that negative pressure; and a wall which is located near the discharge port of that jet pump and against which the flow of fuel delivered from the jet pump hits. The reservoir in this context is a vessel for fuel storage installed in the fuel tank.

With this reservoir unit having an anti-bubble device, fuel containing bubbles delivered from the jet pump fills the reservoir after it hits against the wall. Causing the fuel containing bubbles to hit the wall, thereby to be cleared of bubbles and to fill the reservoir enables the fuel effectively cleared of bubbles to fill the reservoir, and resulting in prevention of allowing a large quantity of bubbles to be introduced into the fuel in the tank.

In the invention, the wall may surround the discharge port of the jet pump and its height may be lower than that of the side wall of the reservoir.

With the wall fully surrounding the discharge port of the jet pump, the fuel can be cleared of bubbles contained in it when introduced from the jet pump before the bubbles dissipate in the reservoir. As the wall surrounding the discharge port is closed like a bag, the fuel present in the reservoir outside the full-circle wall remains in the reservoir even if the fuel pump stops and the fuel within the reservoir goes out of the reservoir through the jet pump. The full-circle wall forbids the fuel near the suction port of the fuel pump from going out of the reservoir.

In the structure described above, it is also possible to form a partition wall on the central part in the full-circle wall and cause the flow delivered by the jet pump to turn round the partition wall.

With this configuration, the fuel delivered from the jet pump fills the reservoir after the flow delivered from the jet pump has turned round the partition wall, and bubbles are removed from the fuel in the reservoir even more efficiently.

In this structure, it is further possible to provide clearances between both sides of the partition wall and the full-circle wall, and to enable the flow delivered from the jet pump to flow fully round the partition wall.

With this configuration, the fuel delivered from the jet pump fills the reservoir after the flow delivered from the jet pump has turned round the partition wall a plurality of times, and bubbles are removed from the fuel in the reservoir even more efficiently.

In the invention, the reservoir and the anti-bubble wall may be integrally molded of resin.

DESCRIPTION OF THE PREFERRED EMBODIMENTS

The following paragraphs enumerate principal features of the preferred embodiments according to the present invention to be described below.

(Mode 1) The reservoir is molded of resin, and a jet pump fitting part and a wall against which the discharge flow from the jet pump hits are integrally formed with that molded body.

(Mode 2) The reservoir is pressed toward the bottom of the fuel tank, and the opening of the jet pump toward outside the reservoir opens into a minute gap between the bottom of the reservoir and that of the fuel tank.

(Mode 3) The reservoir is substantially cylindrical, and its inner space accommodates the fuel pump and the pressure regulator.

(Mode 4) The jet pump, fuel pump and pressure regulator are assembled with the reservoir. In other words, the fuel pump, pressure regulator and jet pump are all put into an assembly with the reservoir in advance.

(Mode 5) The guide rails extending from the upper subunit toward the lower subunit are formed integrally with the upper subunit.

(Mode 6) The lower subunit is pressed against the bottom of the fuel tank by the upper subunit with an elastic member.

(Mode 7) Each of the guide rails extending from the upper subunit toward the lower subunit, is formed in a flat plate shape, and has a long hole formed extending along a center line, in which a large hole is formed to make both sides of it thinner so as to form a frail portion.

(Mode 8) Each of the guide rails, which are formed in a flat plate shape, has at its tip slits extending upward.

(Mode 9) Slots to accept the guide rails are integrally molded with the reservoir.

(Mode 10) A tapered projection is provided in each of the slots, and the guide rail is elastically deformed to ride over the projection to engage the projection with the end of the long hole. Once they are engaged, the projection is prohibited from severing the guide rail.

(Mode 11) A metal plate is arranged inside the slot.

(Mode 12) Snap fits protruding upward are integrally formed with the bottom of the reservoir, and engaging holes are bored on the circumference of the primary filter to engage with the snap fits.

[Embodiments]

A reservoir unit according to a first preferred embodiment of the present invention will now be described in detail with reference to FIG. 1.

Figure 1:
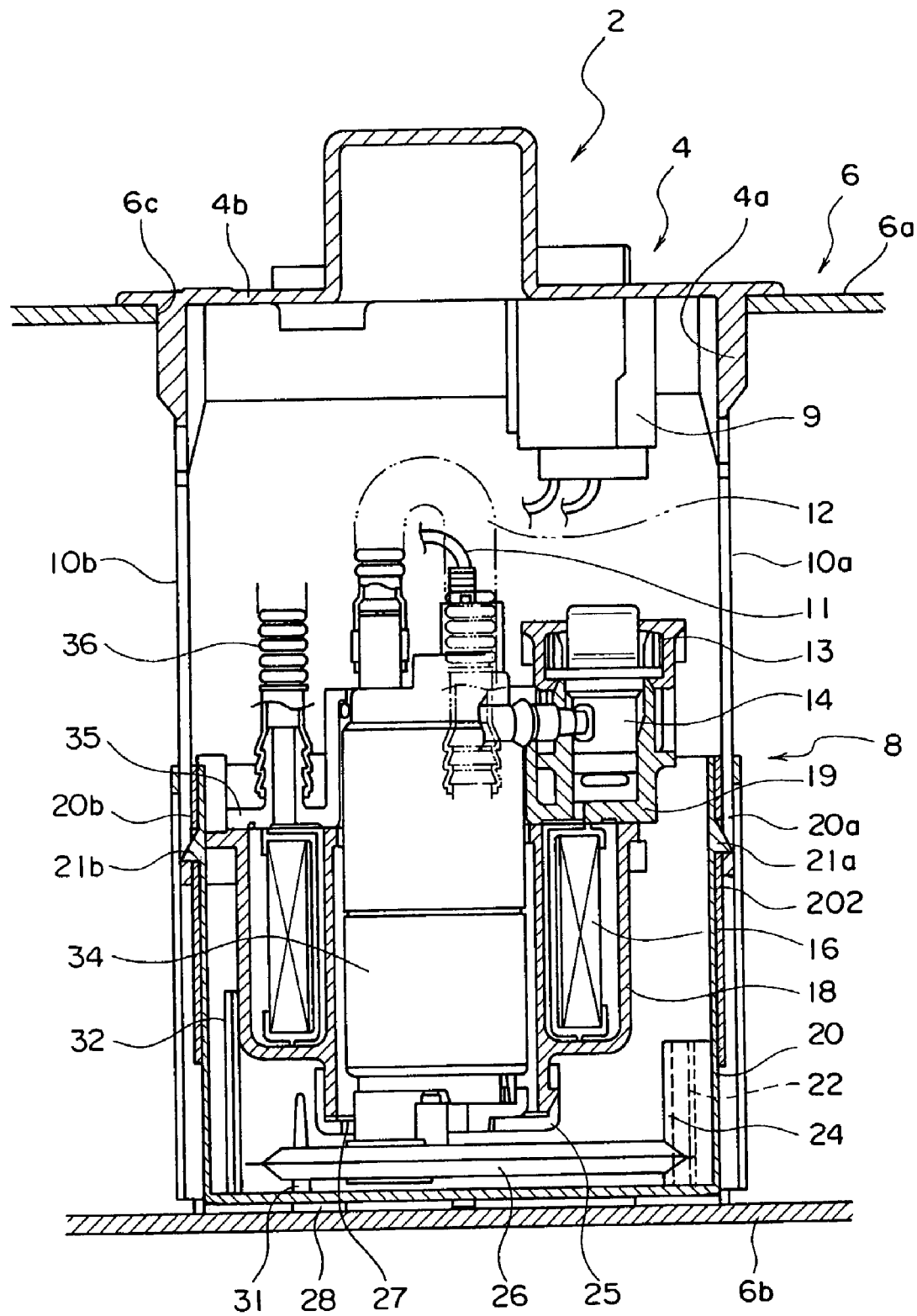
FIG. 1 is a schematic side view of a whole reservoir unit according to the present invention.

As shown in FIG. 1, a reservoir unit 2 of the embodiment comprises an upper subunit 4 and a lower subunit 8, and installed in a fuel tank 6 when it is used. The lower subunit 8 is provided with a reservoir 20 in a cylindrical shape having a bottom (i.e. shaped substantially like a glass), a primary filter 26, a fuel pump 34, a pressure regulator 14 and a secondary filter 16. The primary filter 26, the fuel pump 34, the pressure regulator 14 and the secondary filter 16 are accommodated in the reservoir 20 to be positioned, and constitute an assembly.

The primary filter 26, fuel pump 34, pressure regulator 14, secondary filter 16, reservoir 20 and upper subunit 4 will be described in detail below in this sequence.

Figure 4A:
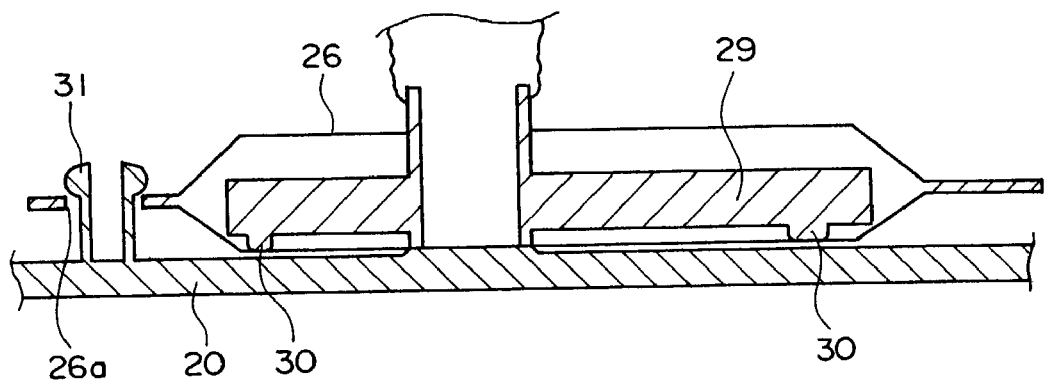
FIG. 4A is a sectional view of a primary filter.
Figure 4B:
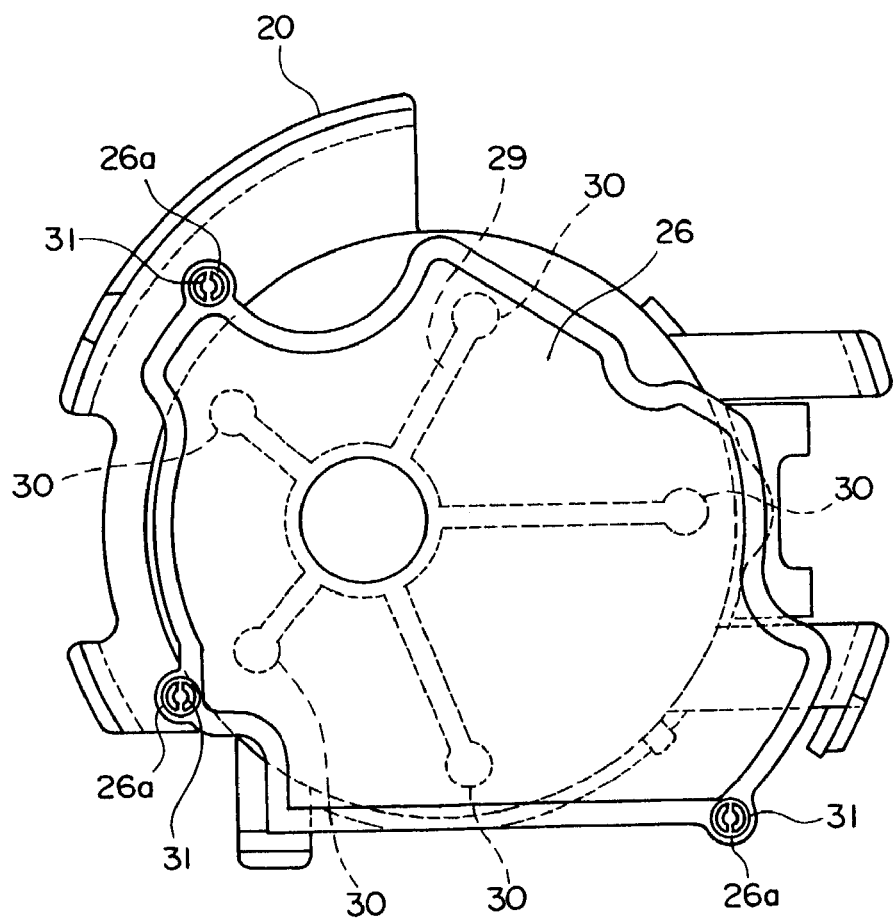
FIG. 4B is a plan view of the same.

The primary filter 26 is configured of a bag filter of fine-texture nylon and a resin-built frame inserted into and securing a certain volume within the bag. The inner space of the bag filter is continuous to the suction port of the fuel pump 34. The primary filter 26 is accommodated in the reservoir 20 and arranged along the inner bottom of the reservoir 20. As shown in FIGS. 4A and 4B, the frame is composed of a swelled portion 30 pressing a few parts of the bottom of the bag filter against the inner bottom of the reservoir 20, and a frame body 29 keeping the other parts of the bottom of the bag filter in a position slightly away from the bottom of the reservoir 20. This arrangement serves to secure spacing between the primary filter 26 and the inner bottom of the reservoir 20 to enable the whole filtering face to perform the filtering function.

On the circumference of the primary filter 26 are bored engaging holes 26a to fit snap fits 31 protruding upward from the inner bottom of the reservoir 20. Engagement of the engaging holes 26a with the snap fits 31 prevents the primary filter 26 from floating away from the inner bottom of the reservoir 20, thereby helping to keep it in a position along the inner bottom of the reservoir 20.

The meshes of the bag filter of fine-texture nylon, when exposed from the fuel, are clogged by the fuel as it surface tension works. As long as even a small part of the bag filter is soaked in the fuel, the fuel enters into the filter through the soaked part of the bag, and accordingly the bag filter can still absorb the fuel even if the remaining quantity of the fuel is so small that the top of the bag filter is exposed. Any foreign matter in the fuel is substantially removed by the primary filter 26, and the remainder is further removed by the secondary filter 16 to be elaborated upon afterwards. The fuel cleared of foreign matter by the primary filter 26 is sucked by the fuel pump.

As shown in FIG. 1, the fuel pump 34 is formed in a substantially vertical columnar shape, and has at its bottom a fuel suction pipe (not shown). To the fuel suction pipe (not shown) is connected the primary filter 26. At the top end of the fuel pump 34, there are provided an electrical connector 11 and a fuel discharge pipe 12.

The fuel pump 34, driven by being supplied with electricity through the electrical connector 11, sucks fuel in the reservoir 20 to be described afterwards from the primary filter 26, raises its pressure, and discharges it from the fuel discharge pipe 12.

To the fuel discharge pipe 12 is connected the pressure regulator 14. The pressure regulator 14 is a relief valve which, when the pressure in the fuel discharge pipe 12 surpasses a prescribed level, lets the fuel escape from the fuel discharge pipe 12 to keep the pressure within the fuel discharge pipe 12 at the prescribed level. It maintains the pressure of the fuel to be fed to the secondary filter 16, and eventually that of the fuel fed to the internal combustion engine, at the prescribed level. The fuel having escaped from the pressure regulator 14 is guided by piping (not shown in FIG. 1) into a jet pump 40 to be described afterwards. The pressure regulator 14 is accommodated in the pressure regulator fitting part 19 of a filter cover 35 to be elaborated upon afterwards, and is supported in a state of being prevented from coming off by the assembling of its cap 13 into the pressure regulator fitting part 19 of the filter cover 35.

Around the fuel pump 34 is formed a doughnut-shaped vessel 18, in which the secondary filter 16, also doughnut-shaped, is accommodated and covered by the filter cover 35 which blocks the top opening of the doughnut-shaped vessel 18. The doughnut-shaped vessel 18 and the filter cover 35 are molded resin items. The doughnut-shaped vessel 18 is bisected by the doughnut-shaped secondary filter 16 into an inner chamber and an outer chamber, and the fuel discharge pipe 12 leads to the outer chamber of the doughnut-shaped vessel 18. To the inner chamber of the doughnut-shaped vessel 18 leads a fuel feed pipe 36. The fuel delivered from the fuel pump 34 passes the secondary filter 16 from the outer chamber of the doughnut-shaped vessel 18 to reach the inner chamber of the doughnut-shaped vessel 18 and enters the fuel feed pipe 36. The fuel feed pipe 36 penetrates the upper subunit 4 and extends out of the fuel tank 6. In this embodiment according to the invention, the fuel feed pipe 36 is connected to an injector via a delivery pipe (neither shown), and supplies the injector with fuel which is raised in pressure by the fuel pump 34, regulated by the pressure regulator 14 to a constant pressure level, and cleared of foreign matter by the primary filter 26 and the secondary filter 16. Into the hollow space within the doughnut-shaped vessel 18 is inserted the fuel pump 34 from its bottom opening. Assembling of a fitting stay 25 to the bottom of the doughnut-shaped vessel 18 results in supporting of the fuel pump 34 in a state in which the pump is prevented from coming off. A cushion rubber 27 intervenes between the fuel pump 34 and the fitting stay 25 to elastically support the fuel pump 34.

Next will be described the upper subunit 4 with reference to FIG. 1 and FIGS. 5A and 5B. The upper subunit 4, which is a molded resin item, is provided with a substantially round disk portion 4b fixed to the top face 6a of the fuel tank 6 to block the opening of the fuel tank 6, a cylindrical wall 4a protruding from the bottom face of the disk portion 4b, and a pair of guide rails 10a and 10b extending downwards from the cylindrical wall 4a. The cylindrical wall 4a can be fit into the fitting holes 6c of the fuel tank 6. As shown in FIG. 1, fitting of the upper subunit 4 to block the fitting holes 6c of the fuel tank 6 results in arrangement and positioning of the reservoir unit 2 in the fuel tank 6. The outer circumference of the upper subunit 4 is mounted over the edges of the fitting holes 6c of the fuel tank 6 via a seal gasket (not shown), and fastened over the fitting holes 6c of the fuel tank 6 with bolts (not shown). This results in fixing of the upper subunit 4 to the fuel tank 6.

The upper subunit 4 has an electrical connector 9 provided with terminals vertically penetrating the disk portion 4b. To the electrical connector 9 of the upper subunit 4 is electrically connected an electrical connector 11 of the fuel pump 34 on the lower side of the upper subunit 4. The electrical connector 9 of the upper subunit 4 is also electrically connected on the top side of the upper subunit 4 to a connector for power feed (not shown).

Figure 5A:
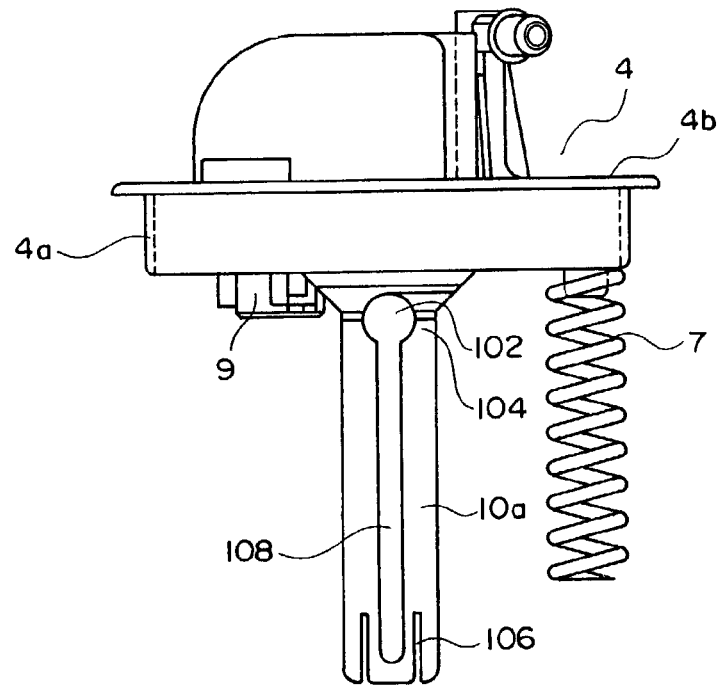
FIG. 5A is a front view of an upper subunit.
Figure 5B:
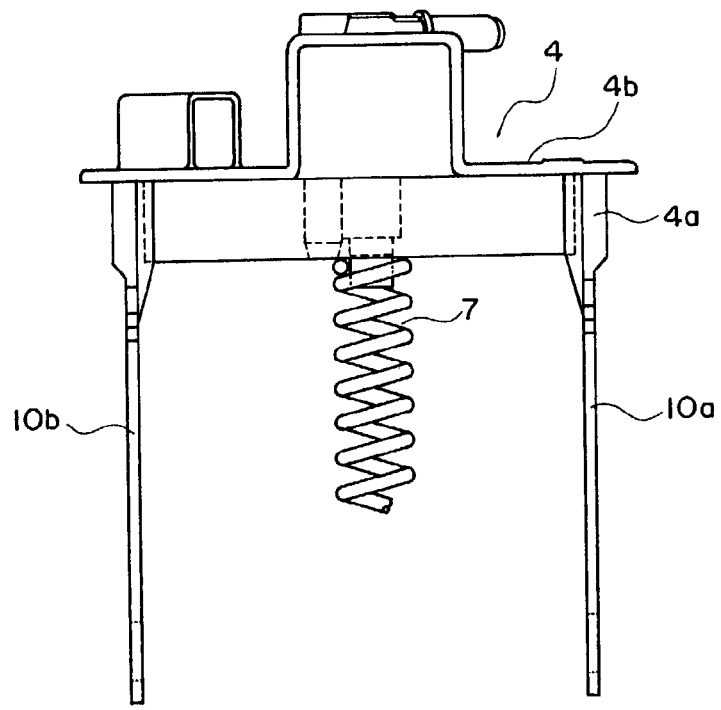
FIG. 5B is a side view of the same.

As well illustrated in FIGS. 5A and 5B, the pair of guide rails 10a and 10b extend from the cylindrical wall 4a of the upper subunit 4. Each of the guide rails 10a and 10b is formed in a flat plate shape. A long hole 108 is formed along the center line of each of the guide rails 10a and 10b. At the top end of the long hole 108 is formed a large hole 102, and the two sides of the large hole 102 constitute a frail portion 104. At the tip of each of the guide rails 10a and 10b are formed slits 106 extending upwards from the lower end. The slits 106 are formed on both sides of the long hole 108.

Figure 6:
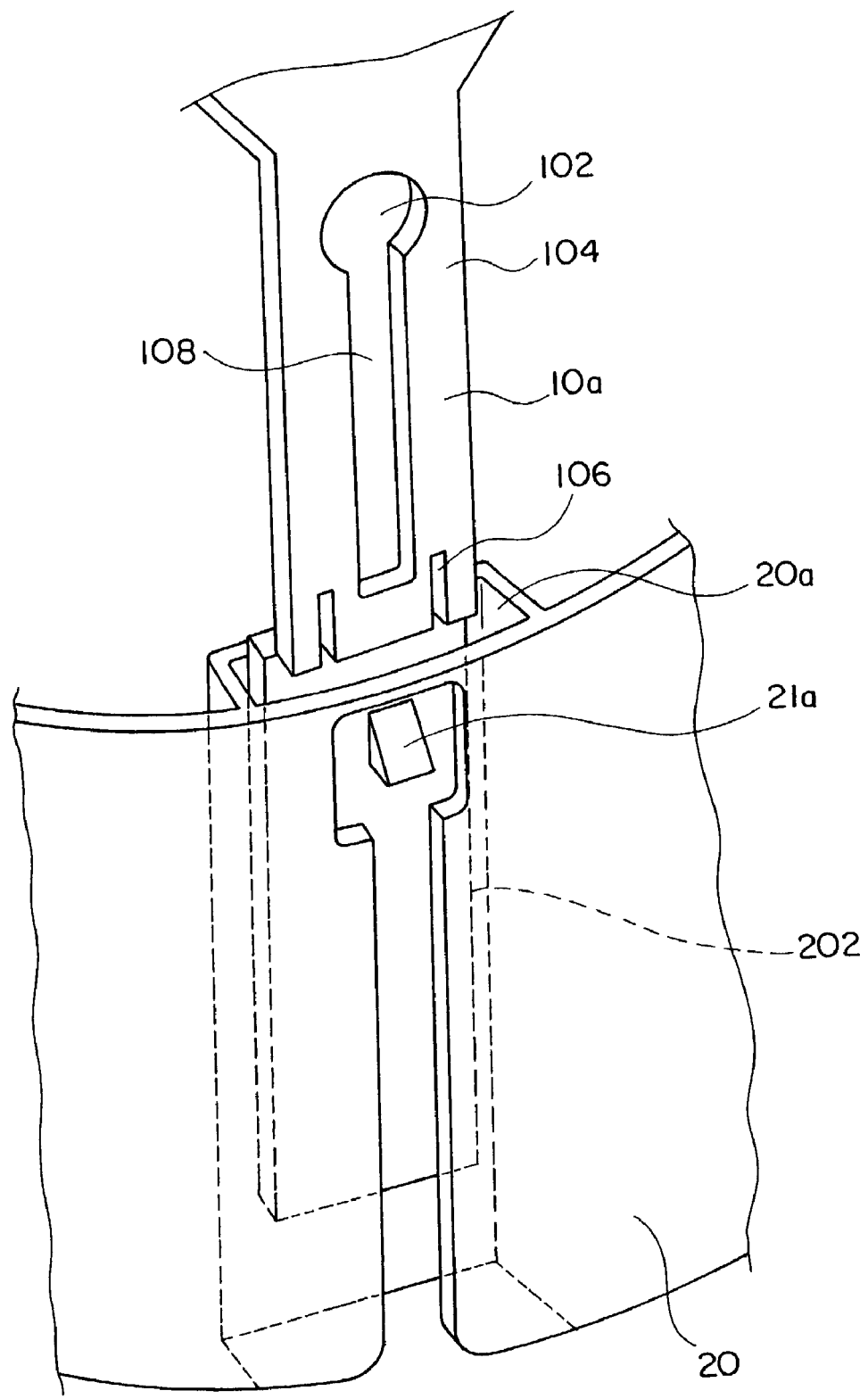
FIG. 6 is a perspective view showing how guide rails and a sheath-shaped slot engage with each other.

As well illustrated in FIG. 6, the reservoir 20 has sheath-shaped slots 20a and 20b to accept the pair of guide rails 10a and 10b, and moves toward or away from the upper subunit 4 along the pair of guide rails 10a and 10b. Within the sheath-shaped slots 20a and 20b are provided tapered projections 21a and 21b on which the guide rails 10a and 10b are slidable in only one direction. When the upper subunit 4 and the lower subunit 8 are assembled, the guide rails 10a and 10b are elastically deformed to ride over the tapered projections 21a and 21b. During normal use, the tapered projections 21a and 21b are engaged with the ends of the long holes 108 of the guide rails 10a and 10b so that the upper subunit 4 and the lower subunit 8 may not sever from each other.

Inside the sheath-shaped slots 20a and 20b to accept the guide rails 10a and 10b are arranged metal plates 202. They can prevent, when the guide rails 10a and 10b and the slots 20a and 20b on the reservoir side to accept them slide relative to each other, squeaking noise or the like from arising. There is no particular limitation to the material of the metal plates 202, but stainless steel, which is resistant to corrosion, has been selected for this embodiment of the invention.

Between the upper subunit 4 and the lower subunit 8 is provided a compression spring 7 (not shown in FIG. 1) as the elastic member, and the spring 7 presses the lower subunit 8 toward the bottom 6b of the fuel tank 6. The fuel tank 6 is blow-molded of resin, and is subject to deformation by a change in the quantity of remaining fuel and/or a change in atmospheric temperature. Therefore, the lower subunit 8 is pressed all the time toward the bottom 6b of the fuel tank 6 regardless of the deformation of the fuel tank 6.

When a vehement acceleration works on the fuel tank 6, the reservoir unit 2 tends to be displaced relative to the fuel tank 6. If the guide rails 10a and 10b are firm then, the disk portion 4b of the upper subunit 4 may be destroyed when the reservoir unit 2 is displaced relative to the fuel tank 6. The disk portion 4b of the upper subunit 4 is especially subject to destruction at the roots of the guide rails 10a and 10b. When the disk portion 4b is destroyed, the fuel may escape from the fuel tank 6. In the embodiment, as the frail portion 104 is formed in the guide rails 10a and 10b, even if a vehement acceleration works on the fuel tank 6 and the reservoir unit 2 is displaced relative to the fuel tank 6, the frail portion 104 will be destroyed first, and therefore the disk portion 4b will not be. As there is the frail portion 104, it can prevent the disk portion 4b from being damaged, so as to leak the fuel. To add, even if the frail portion 104 is destroyed, the fuel pump can continue to work because electric cables to drive the fuel pump and the hose to feed fuel remain connected. Thus it is possible to continue to feed fuel to the engine, and thereby enabling the motor vehicle to run as required for ensuring safety.

Figure 2A:
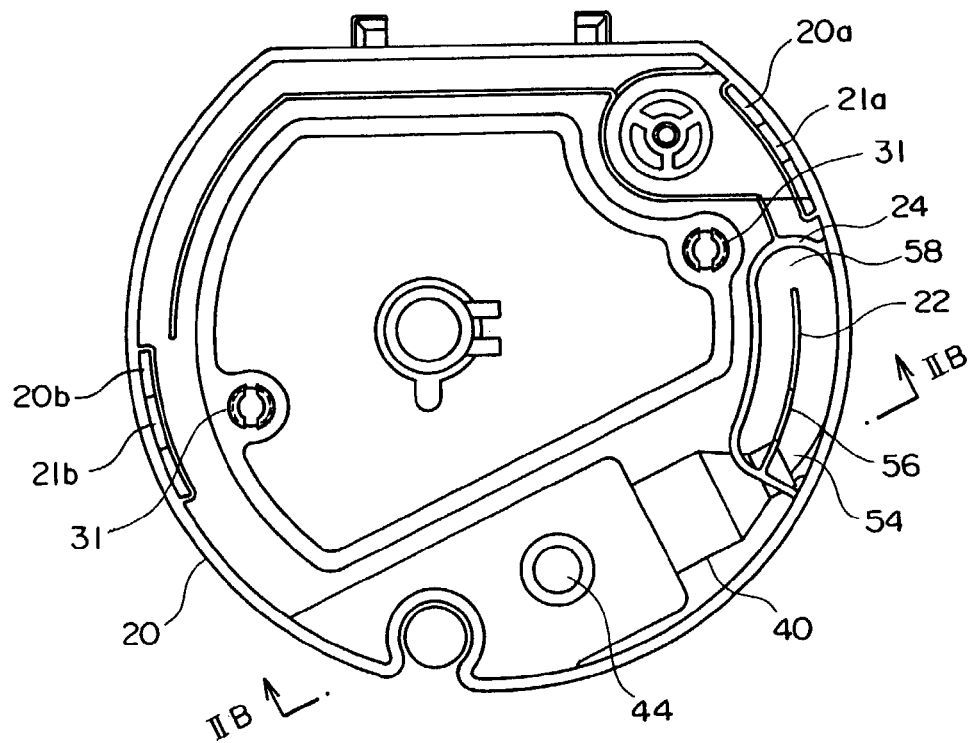
FIG. 2A is a plan view of a reservoir according to a first preferred embodiment of the invention.

FIG. 2A shows a plan view of the reservoir 20, wherein the positions of the snap fits 31 are altered from those shown in FIGS. 4A and 4B. Two snap fits 31 are sufficient to keep the primary filter 26 arranged along the bottom of the reservoir 20.

Figure 2B:
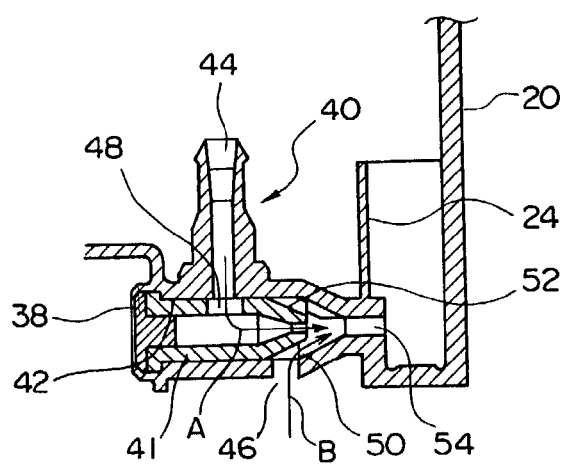
FIG. 2B is a sectional view taken along a center line (line IIB—IIB) of a jet pump in FIG. 2A.

FIG. 2B shows a sectional view of the jet pump 40 taken along the center line (a line IIB—IIB) shown in FIG. 2A. In the bottom of the reservoir 20, which is composed of a molded item of resin, is formed a concave 42 to accept a jet pump body 41 of the jet pump 40, and openings 44 and 46 communicating to the concave are formed, penetrating the wall of the reservoir 20. The opening 44 is fitted with a hose to connect the pressure regulator 14 and the opening 44, so that returning fuel from the pressure regulator 14 can be guided to the opening 44. The opening 46 opens into the gap between the bottom of the reservoir 20 and the bottom 6b of the fuel tank 6. As shown in FIG. 1, a slight spacing is secured between the bottom of the reservoir 20 and the bottom 6b of the fuel tank 6 by projections 28.

The jet pump body 41 is accommodated in the concave 42, and the subsequent fixing of a plug 38 to the reservoir 20 causes the jet pump body 41 to be fixed to the reservoir 20. The jet pump body 41 is provided with an opening 48 to accept returning fuel from the pressure regulator 14, a passage 50 for accepting fuel from outside the reservoir 20, and a venturi tube 52. When the jet pump body 41 is fixed to the reservoir 20, the opening 44 becomes continuous to the opening 48, and the opening 46, to the passage 50.

As returning fuel from the pressure regulator 14 is guided to the opening 44, that fuel passes through the venturi tube 52 of the jet pump 40 as indicated by arrow A. As the flow rate of returning fuel jetting out of the venturi tube 52 is fast, a negative pressure is generated in the downstream part of the venturi tube 52. This negative pressure causes, as indicated by arrow B, fuel outside the reservoir 20 to pass through the opening 46 and the passage 50 to be sucked by the jet pump 40 and discharged out of its discharge port 54.

From the discharge port 54 of the jet pump 40 are discharged returning fuel from the pressure regulator 14 and fuel sucked from outside the reservoir 20. Utilizing the flow velocity of returning fuel from the pressure regulator 14, the jet pump 40 introduces fuel outside the reservoir 20 into the reservoir 20.

The fuel discharged from the discharge port 54 of the jet pump 40 contains many bubbles. When it is powerfully discharged into the reservoir 20, the inner space of the reservoir may be filled with fuel containing many bubbles. If the reservoir 20 is filled with fuel containing bubbles, the fuel pump 34 may take in many bubbles and become vapor-locked, or the fuel containing bubbles may be supplied to the injector to disable the injector to inject the intended quantity of fuel.

In this embodiment according to the invention, in order to prevent the reservoir 20 from being filled with fuel containing bubbles, a wall 24 fully surrounding the discharge port 54 of the jet pump 40 is molded integrally with the resin-built reservoir 20. Thus, the flow delivered from the jet pump 40 is discharged into the closed space surrounded by the full-circle wall 24, the fuel in that closed space is cleared of the bubbles, and the fuel is moved outside the wall 24 after it is cleared of the bubbles, thereby preventing the presence of many bubbles in the fuel within the reservoir 20 outside the wall 24.

As shown in FIG. 2A, the wall 24 fully surrounds the discharge port 54 of the jet pump 40. Its height is less than that of the side wall of the reservoir 20. There is no particular limitation to the shape of the wall 24, but it preferably should have no corner in its planar view, i.e., be substantially oval or substantially circular, shaped like a bean, because any corner might invite concentration of bubbles in the fuel in that corner.

A partition wall 22 is formed at a central part in the full-circle wall 24, so configured that fuel delivered from the jet pump 40 flow round the partition wall 22. The fuel delivered from the jet pump 40 is discharged along the partition wall 22.

Figure 3A:
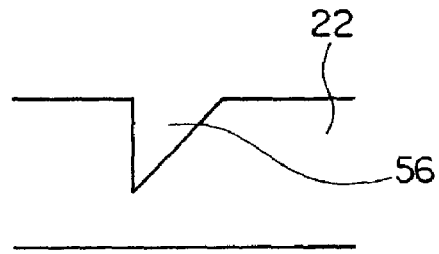
FIGS. 3A through 3C are front views of one example and its modified versions of a partition wall according to the first embodiment of the invention.
Figure 3B:
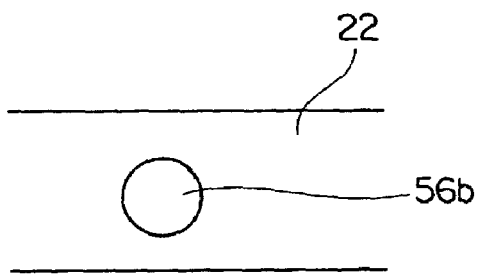
Figure 3C:
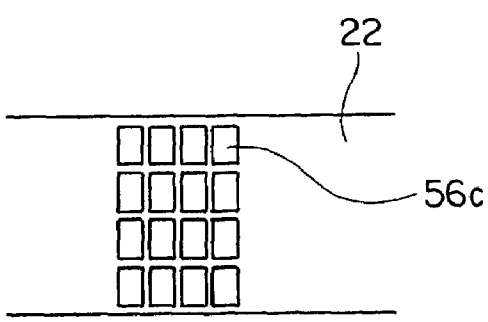

Clearances 56 and 58 are secured between the two sides of the partition wall 22 and the full-circle wall 24. The clearance 56 can be formed by notching a part of the wall 22 as shown in FIG. 3A. It is sufficient for the clearance 56 to permit the delivered flow to turn round the partition wall 22 a plurality of times, any of the hole-shaped clearance 56b shown in FIG. 3B, a meshed clearance 56c as shown in FIG. 3C or the like may be applied as appropriate.

In this embodiment according to the invention, bubbles are removed in the following manner.

(1) The fuel containing bubbles delivered from the discharge port 54 of the jet pump 40 is not directly discharged into the reservoir 20, but it goes into and fill the reservoir 20 only after it hits the wall 24 and is thereby slowed in flow rate. For this reason, the flow rate of the fuel in the reservoir 20 is slow, and bubbles contained in the fuel float so as to prevent many of them from being sucked by the fuel pump 34.

(2) When the fuel from the discharge port 54 of the jet pump 40 hits the wall 24, the removal of bubbles is accelerated.

(3) The fuel from the discharge port 54 of the jet pump 40 flows guided by the partition wall 22 and, when it sharply changes its direction in something like a U-turn at the end of the wall, the removal of bubbles is accelerated.

(4) As the fuel from the discharge port 54 of the jet pump 40 flows guided by the partition wall 22 and while it turns round the partition wall 22 a plurality of times, the removal of bubbles is accelerated.

The configuration of the walls 22 and 24 shown in FIG. 2A provides all the four of the above-described effects, resulting in virtually complete removal of bubbles.

When the quantity of bubbles contained in the fuel delivered from the jet pump 40 is small, the above-described anti-bubble measures need not be fully implemented.

Figure 7:
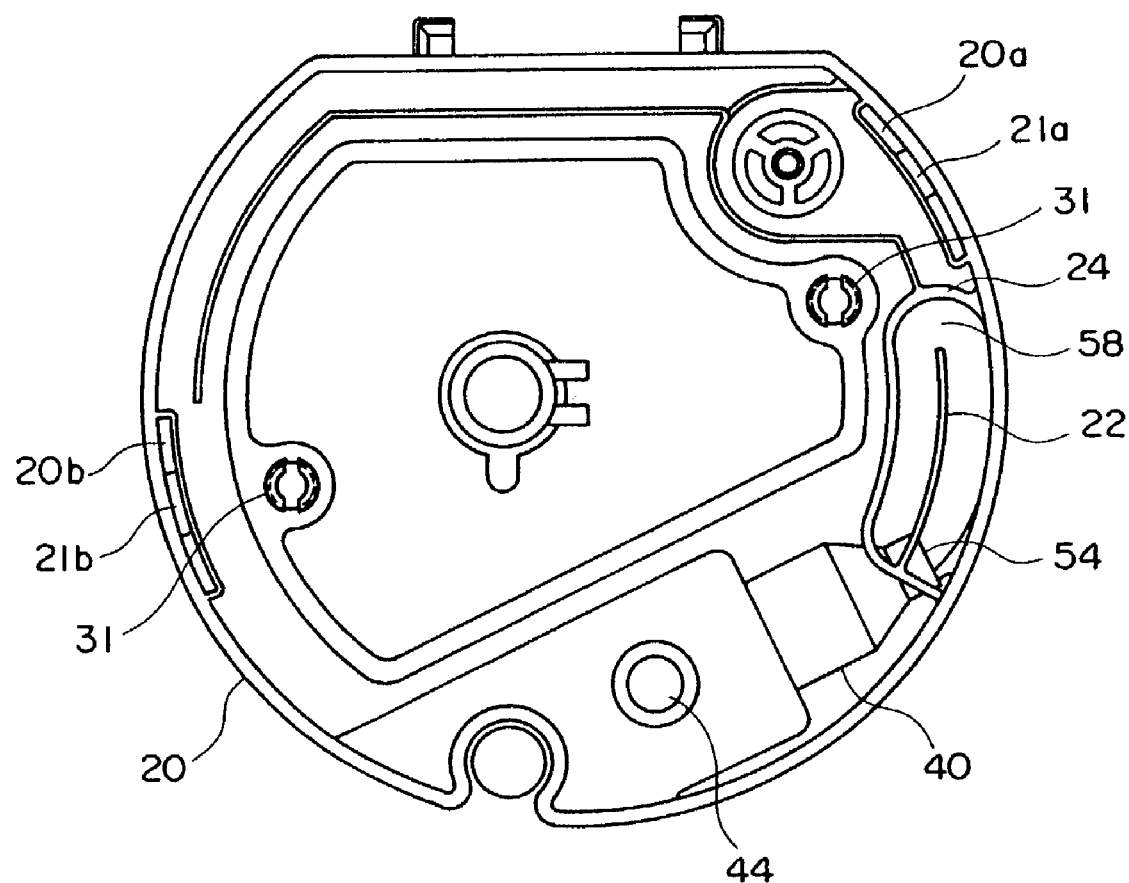
FIG. 7 is a plan view of a reservoir according to a second preferred embodiment of the invention.

In that case, for instance, the clearance 56 of the partition wall 22 on the jet pump side can be dispensed with as in the second preferred embodiment according to the invention, shown in FIG. 7.

Figure 8:
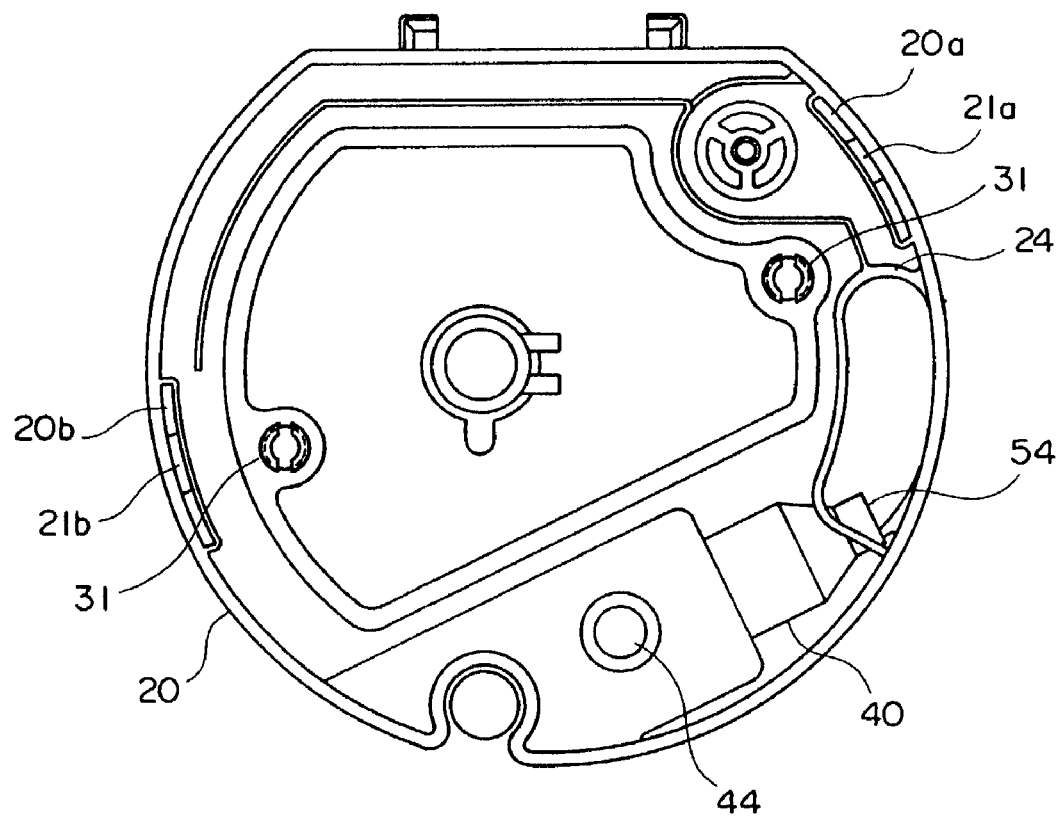
FIG. 8 is a plan view of a reservoir according to a third preferred embodiment of the invention.

Or, the partition wall 22 itself may be unnecessary as in the third preferred embodiment according to the invention, shown in FIG. 8.

Figure 9:
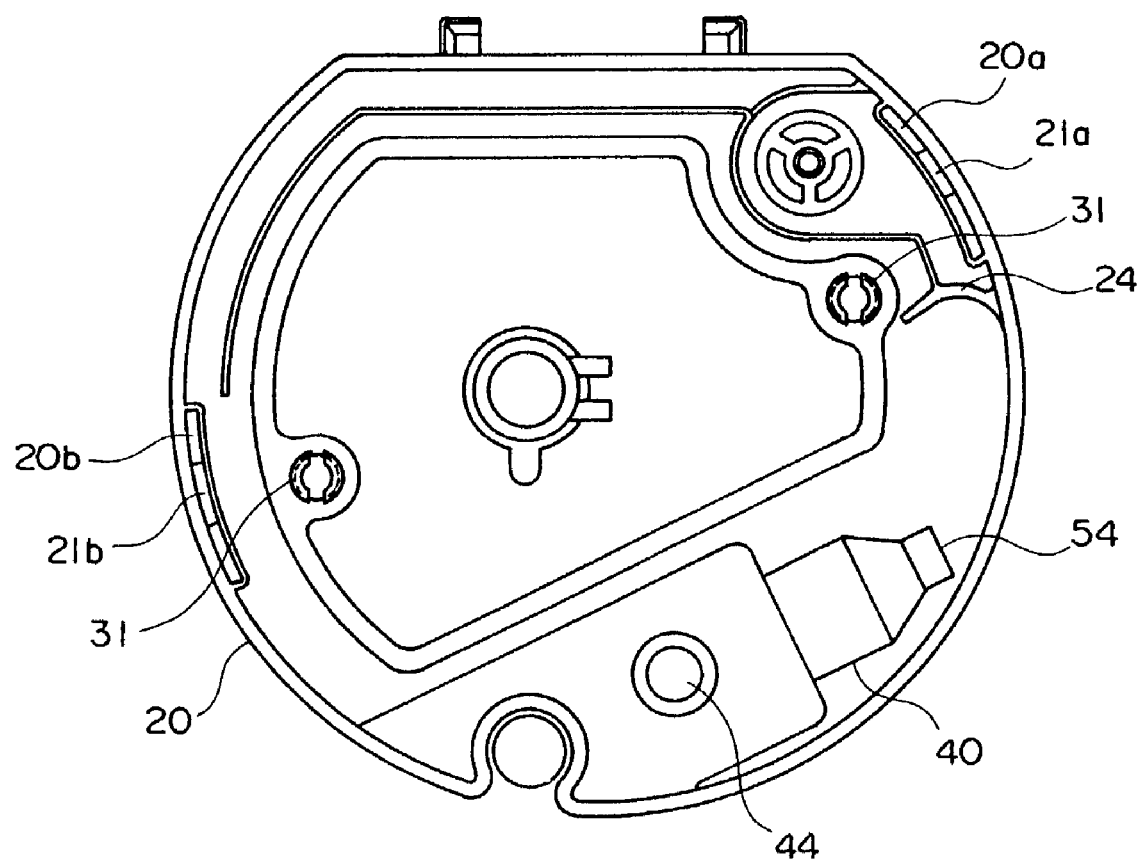
FIG. 9 is a plan view of a reservoir according to a fourth preferred embodiment of the invention.

Further, the wall which the injected flow hits against need not fully encircle the discharge port, but may only serve the purpose of letting the flow hit against as in the fourth preferred embodiment according to the invention, shown in FIG. 9. In this case, it is preferable for this wall 24 to be concavely shaped relative to the delivered flow in its planar view, because this shape would contribute to increasing the ratio of bubbles being caught.

Incidentally, although the fuel tank in the above embodiments is made of resin, the tank may be made of the conventional material.

While the invention has been described with reference to preferred embodiments thereof, they are presented as mere examples, but nothing to limit the scope of claims for the patent. Various modifications and alterations of the specific embodiments described above can be included within the spirit and scope of the following claims.

Further, the technical elements described in this specification or illustrated in the accompanying drawings can prove technically useful either by themselves or in various combinations, but not limited to the combinations in the claims contained in the application. The aspects of the art described in this specification or illustrated in the accompanying drawings achieve a plurality of objects at the same time, and achieving any one of those objects can be technically useful in itself.

In the reservoir unit according to the invention, as it has a wall against which a fuel flow delivered from the jet pump hits, fuel containing bubbles does not fill its reservoir, and accordingly it can prevent the fuel pump from sucking a large quantity of bubbles.

Further, in the invention, the bubble eliminating effect is particularly significant when the wall against which the fuel flow delivered from the jet pump hits surrounds the discharge port in a full circle. Further, the wall fully surrounding the discharge port serves as a breakwater against the leaking outside the reservoir of the fuel in the reservoir when the fuel in the reservoir flows back through the jet pump, and thereby prevents the fuel near the suction port of the fuel pump from going out of the reservoir. As a result, even when the fuel pump remains out of operation for a long time with only a small quantity of fuel remaining in it, the fuel feed can be smoothly resumed.

Further, providing a partition wall at the central part in the full-circle wall in the above-described configuration would provide a whirling stream and result in even more efficient removal of bubbles.

By securing clearances on both sides of the partition wall in the configuration according to the invention, a stream turning round the partition wall a plurality of times can be obtained, resulting in virtually complete elimination of bubbles having introduced into the fuel.

What is claimed is:

1. A reservoir unit having an anti-bubble device comprising:
    a cylindrical reservoir having a bottom for being installed in a fuel tank,
    a fuel pump for sucking fuel in said reservoir,
    a pressure regulator for regulating pressure of the fuel delivered from the fuel pump at a constant level by allowing part of the fuel delivered from said fuel pump to escape,
    a jet pump for accepting the fuel escaping from the pressure regulator, generating a negative pressure by utilizing its flow velocity, and introducing fuel outside the reservoir into the reservoir with said negative pressure, and
    a wall which is located near the discharge port of said jet pump and against which the flow of fuel delivered from the jet pump hits obliguely in a horizontal direction, wherein:
    said wall surrounds the discharge port of the jet pump and has a height that is lower than that of the side wall of the reservoir, and
    a partition wall is formed at a central part in said surrounding wall and the flow delivered by the jet pump turns round the partition wall.

2. A reservoir unit as claimed in claim 1, wherein clearances are secured between two sides of said partition wall and the surrounding wall, and the flow delivered from the jet pump can flow fully round the partition wall.

3. A reservoir unit as claimed in claim 1, wherein said surrounding wall and reservoir are integrally molded of resin.

4. A reservoir unit as claimed in claim 2, wherein said surrounding wall and reservoir are integrally molded of resin.

5. A reservoir unit as claimed in claim 1, wherein said fuel tank is made of resin.

6. A reservoir unit as claimed in claim 2, wherein said fuel tank is made of resin.

7. A reservoir unit as claimed in claim 3, wherein said fuel tank is made of resin.

8. A reservoir unit as claimed in claim 4, wherein said fuel tank is made of resin.

* * * * *